United States Patent
Marchiori et al.

(10) Patent No.: US 11,004,170 B2
(45) Date of Patent: May 11, 2021

(54) CONVERTING FLASH CONTENT TO HTML CONTENT BY GENERATING AN INSTRUCTION LIST

(71) Applicant: Google LLC, Mountain View, CA (US)

(72) Inventors: Eugenio Jorge Marchiori, London (GB); Richard Geoffrey Earnshaw, London (GB)

(73) Assignee: Google LLC, Mountain View, CA (US)

( * ) Notice: Subject to any disclaimer, the term of this patent is extended or adjusted under 35 U.S.C. 154(b) by 1079 days.

(21) Appl. No.: 14/943,964

(22) Filed: Nov. 17, 2015

(65) Prior Publication Data
US 2017/0140494 A1 May 18, 2017

(51) Int. Cl.
*G06F 9/44* (2018.01)
*G06T 1/20* (2006.01)
*G06F 8/51* (2018.01)

(52) U.S. Cl.
CPC . *G06T 1/20* (2013.01); *G06F 8/51* (2013.01)

(58) Field of Classification Search
CPC .................................. G06F 8/51; G06T 1/20
See application file for complete search history.

(56) References Cited

U.S. PATENT DOCUMENTS

| | | | |
|---|---|---|---|
| 6,657,647 B1 * | 12/2003 | Bright | H04L 67/02 715/856 |
| 7,106,343 B1 * | 9/2006 | Hickman | G06T 11/40 345/589 |
| 7,398,464 B1 * | 7/2008 | Wei | G06F 17/2264 715/210 |
| 2003/0063105 A1 * | 4/2003 | Agnew | G06T 11/60 345/660 |

(Continued)

FOREIGN PATENT DOCUMENTS

| | | |
|---|---|---|
| CN | 103176986 | 6/2013 |
| WO | WO-2012/134633 | 10/2012 |

(Continued)

OTHER PUBLICATIONS

Tsuyoshi Osumi, The program technique to become a useful programmer by learning from the Android Flash Player development Apr. 1, 2012, ISBN 978-4-7980-3307-5, p. 34-p. 35 (Year: 2012).*

(Continued)

*Primary Examiner* — Hang Pan
(74) *Attorney, Agent, or Firm* — Foley and Lardner LLP

(57) ABSTRACT

Systems and methods for converting FLASH content to HTML content is described herein. A transcoder module can receive a FLASH-based content item including instructions to cause a computing device to generate or access a display list comprising display objects. The transcoder module can traverse the display list to identify a class type for each display object. The transcoder module can generate a set of HTML-based instructions based on the class type for each display object. The transcoder module can insert the generated set of HTML-based instructions into an instruction list. The transcoder module can store the instruction list in a data structure. An policy generator module can generate an execution policy. The execution policy can specify an application of a client device to execute the sets of HTML-based instructions in the instructions list based on a trigger condition.

19 Claims, 4 Drawing Sheets

(56) References Cited

U.S. PATENT DOCUMENTS

| | | | | |
|---|---|---|---|---|
| 2006/0048056 | A1* | 3/2006 | Huang | G06T 13/80 |
| | | | | 715/719 |
| 2010/0271397 | A1* | 10/2010 | Feldstein | G06T 11/203 |
| | | | | 345/646 |
| 2012/0249870 | A1* | 10/2012 | Senster | G06F 17/30899 |
| | | | | 348/441 |
| 2012/0260181 | A1* | 10/2012 | Sule | G06F 9/4843 |
| | | | | 715/736 |
| 2013/0283151 | A1 | 10/2013 | Deguzman et al. | |
| 2015/0088970 | A1* | 3/2015 | Wei | H04L 67/10 |
| | | | | 709/203 |
| 2016/0105374 | A1* | 4/2016 | Thackray | H04L 67/2819 |
| | | | | 709/226 |
| 2017/0017886 | A1* | 1/2017 | Gao | G06N 5/04 |

FOREIGN PATENT DOCUMENTS

| | | | | |
|---|---|---|---|---|
| WO | WO-2012134633 A1 * | 10/2012 | | G06F 8/52 |
| WO | WO-2013/179352 A1 | 12/2013 | | |
| WO | WO-2013179352 A1 * | 12/2013 | | H04L 67/04 |
| WO | WO-2014/024255 A1 | 2/2014 | | |
| WO | WO-2014024255 A1 * | 2/2014 | | G06F 16/957 |

OTHER PUBLICATIONS

Bebenita, Michael, "Intro. Mozilla/Shumway Wiki . GitHub", Jun. 6, 2013, XP055346570, retrieved from the Internet: URL: https://github.com/mozilla/shumway/wiki/Intro.
International Preliminary Report on Patentability for PCT/US2016/062108 dated Feb. 14, 2018.
International Search Report and Written Opinion for related Application No. PCT/US2016/062108, dated Mar. 1, 2017.
JP First Office Action dated Jan. 21, 2019 in Japanese Patent Application No. 2017-567726.
Non-Final Office Action on U.S. Appl. No. 14/943,964 dated Feb. 26, 2019.
Osumi, T., "The Program technique to become a useful programmer by learning from the Android Flash Player development" (2012), ISBN 978-4-7980-3307-5, p. 34-35.
Examination Report for EP Appln. Ser. No. 16806357.6 dated Apr. 23, 2020 (6 pages).
First Office Action for CN Appln. Ser. Appl. No. 201680034583.7 dated Jul. 16, 2020 (16 pages).
Examination Report for GB Appln. Ser. No. 1720885.1 dated Feb. 1, 2021 (5 pages).
Second Office Action for CN Appln. Ser. No. 201680034583.7 dated Feb. 2, 2021 (15 pages).

* cited by examiner

CONVERTING FLASH CONTENT TO HTML CONTENT BY GENERATING AN INSTRUCTION LIST

BACKGROUND

In a computer networked environment, visual content, both raster and vector graphics, may be rendered on Internet-based resource pages (e.g., webpages) using the ADOBE® FLASH® format, such as a SHOCKWAVE® FLASH (SWF) movie file or application. Rendering visual content using the FLASH format may consume much of the computer's resources. Applications running the FLASH format may also be vulnerable to security issues.

SUMMARY

At least one aspect is directed to a method of converting FLASH content to HyperText Markup Language (HTML) content. The method can include receiving a FLASH-based content item including a display list comprising a first display object and a second display object. The method can include traversing the display list to identify a class type for the first display object. The method can include generating a first set of HTML-based instructions based on the class type for the first display object. The method can include inserting the generated first set of HTML-based instructions into an instruction list. The method can include traversing the display list to identify a class type for the second display object. The method can include generating a second set of HTML-based instructions based on the class type for the second display object. The method can include inserting the generated second set of HTML-based instructions to the instruction list including the first set of HTML-based instructions. The method can include storing, onto a database, the instruction list in a data structure.

In some implementations, the method can include generating, an execution policy specifying an application to execute the first set of HTML-based instructions and the second set of HTML-based instructions based on a trigger condition. In some implementations, trigger condition can specify the application to execute at least one of the first set of HTML-based instructions and the second set of HTML-based instructions responsive to determining that the application is idle. In some implementations, the method can include generating, by a policy generator module, an execution policy specifying an application to execute the first set of HTML-based instructions and the second set of HTML-based instructions based on a trigger condition. In some implementations, trigger condition can specify the application to execute at least one of the first set of HTML-based instructions and the second set of HTML-based instructions responsive to determining that a time duration of the execution of at least one of the first set of HTML-based instructions and the second set of HTML-based instructions exceeds a predefined time delay. In some implementations, the method can include sorting the instruction list based on a weight for the first set of HTML-based instructions and the second set of HTML-based instructions.

In some implementations, the method can include determining that the first display object includes a child display object. In some implementations, the method can include identifying, responsive to determining that the first display object includes the child display object a class type for the child display object. In some implementations, the method can include generating a third set of HTML-based instructions based on the class type for the child display object. In some implementations, the method can include inserting the third set of HTML-based instructions into the instruction list. In some implementations, inserting the generated first set of HTML-based instructions into the instruction list can further include inserting the first set of HTML-based instructions, subsequent to inserting the third set of HTML-based instructions to the instruction list.

In some implementations, identifying the class type for the first display object can further include determining that the first display object includes a MovieClip display object container, the MovieClip display object container comprising a first child display object and a second child display object. In some implementations, generating the first set of HTML-based instructions can further include generating, responsive to determining that the first display object includes the MovieClip display object container, a third set of HTML-based instructions for the first child display object based on the class type of the first child display object. In some implementations, generating the first set of HTML-based instructions can further include generating, responsive to determining that the first display object includes the MovieClip display object container, a fourth set of HTML-based instructions for the second child display object based on the class type of the second child display object. In some implementations, inserting the generated first set of HTML-based instructions into the instruction list can further include inserting the third set of HTML-based instructions and the fourth set of HTML-based instructions.

In some implementations, generating the third set of HTML-based instructions can further include generating a blend instruction based on a blend mode of the MovieClip display object container. In some implementations, generating the fourth set of HTML-based instructions can further include generating a filter instruction based on a filter of the MovieClip display object container.

In some implementations, identifying the class type for the first display object can further include identifying the class type for the first display object, the class type for the first display object includes one of a Bitmap, a Shape, a Sprite, a MovieClip, a TextField, a TextLine, a StaticText, or a Video. In some implementations, identifying the class type for the second display object can further include identifying the class type for the first display object, the class type for the second display object includes one of a Bitmap, a Shape, a Sprite, a MovieClip, a TextField, a TextLine, a StaticText, or a Video. In some implementations, generating the first set of HTML-based instructions can further include generating the first set of HTML-based instructions including at least one of a stack instruction, a clip instruction, a blend instruction, a draw shape instruction, a draw text instruction, a draw bitmap instruction, and a draw video instruction. In some implementations, generating the second set of HTML-based instructions can further include generating the second set of HTML-based instructions including at least one of the stack instruction, the clip instruction, the blend instruction, the draw shape instruction, and the draw text instruction, the draw bitmap instruction, and the draw video instruction.

In some implementations, inserting the generated first set of HTML-based instructions can further include enqueueing the generated first set of HTML-based into the instruction list. In some implementations, the instruction list can include a queue data structure. In some implementations, inserting the generated second set of HTML-based instructions can further include enqueueing the generated second set of HTML-based instructions into the instruction list.

At least one aspect is directed to a system for converting FLASH content to HyperText Markup Language (HTML)

content. The system can include a transcoder module executing one or more processors. The transcoder module can receive a FLASH-based content item including a display list comprising a first display object and a second display object. The transcoder module can traverse the display list to identify a class type for the first display object. The transcoder module can generate a first set of HTML-based instructions based on the class type for the first display object. The transcoder module can insert the generated first set of HTML-based instructions into an instruction list. The transcoder module can traverse the display list to identify a class type for the second display object. The transcoder module can generate a second set of HTML-based instructions based on the class type for the second display object. The transcoder module can insert the generated second set of HTML-based instructions to the instruction list including the first set of HTML-based instructions. The transcoder module can store, onto a database, the instruction list in a data structure.

In some implementations, the system can further include a policy generator. In some implementations, the policy generator can generate an execution policy specifying an application of a client device to execute the first set of HTML-based instructions and the second set of HTML-based instructions based on a trigger condition. In some implementations, the trigger condition can specify the application to execute at least one of the first set of HTML-based instructions and the second set of HTML-based instructions responsive to determining that the application is idle. In some implementations, the policy generator can generate an execution policy specifying an application of a client device to execute the first set of HTML-based instructions and the second set of HTML-based instructions based on a trigger condition. In some implementations, the trigger condition can specify the application to execute at least one of the first set of HTML-based instructions and the second set of HTML-based instructions responsive to determining that a time duration of the execution of at least one of the first set of HTML-based instructions and the second set of HTML-based instructions exceeds a predefined time delay. In some implementations, the policy generator can sort the instruction list based on a weight for the first set of HTML-based instructions and the second set of HTML-based instructions.

In some implementations, the transcoder module can determine that the first display object includes a child display object. In some implementations, the transcoder module can identify, responsive to determining that the first display object includes the child display object, a class type for the child display object. In some implementations, the transcoder module can generate a third set of HTML-based instructions based on the class type for the child display object. In some implementations, the transcoder module can insert the third set of HTML-based instructions into the instruction list. In some implementations, the transcoder module can insert the first set of HTML-based instructions, subsequent to inserting the third set of HTML-based instructions to the instruction list.

In some implementations, the transcoder module can determine that the first display object includes a MovieClip display object container, the MovieClip display object container comprising a first child display object and a second child display object. In some implementations, the transcoder module can generate, responsive to determining that the first display object includes the MovieClip display object container, a third set of HTML-based instructions for the first child display object based on the class type of the first child display object. In some implementations, the transcoder module can generate, responsive to determining that the first display object includes the MovieClip display object container, a fourth set of HTML-based instructions for the second child display object based on the class type of the second child display object. In some implementations, the transcoder module can insert the third set of HTML-based instructions and the fourth set of HTML-based instructions.

In some implementations, the transcoder module can generate a blend instruction based on a blend property of the MovieClip display object container. In some implementations, the transcoder module can generate a filter instruction based on a filter of the MovieClip display object container.

In some implementations, the transcoder module can identify the class type for the first display object, the class type for the first display object includes one of a Bitmap, a Shape, a Sprite, a MovieClip, a TextField, a TextLine, a StaticText, or a Video. In some implementations, the transcoder module can identify the class type for the first display object, the class type for the second display object includes one of the Bitmap, the Shape, the Sprite, the MovieClip, the TextField, the TextLine, the StaticText, or the Video. In some implementations, the transcoder module can generate the first set of HTML-based instructions including at least one of a stack instruction, a clip instruction, a blend instruction, a draw shape instruction, a draw text instruction, a draw bitmap instruction, and a draw video instruction. In some implementations, the transcoder module can generate the second set of HTML-based instructions including at least one of the stack instruction, the clip instruction, the blend instruction, the draw shape instruction, the draw text instruction, the draw bitmap instruction, and the draw video instruction.

In some implementations, the transcoder module can enqueue the generated first set of HTML-based into the instruction list. In some implementations, the instruction list can include a queue data structure. In some implementations, the transcoder module can enqueue the generated second set of HTML-based instructions into the instruction list.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
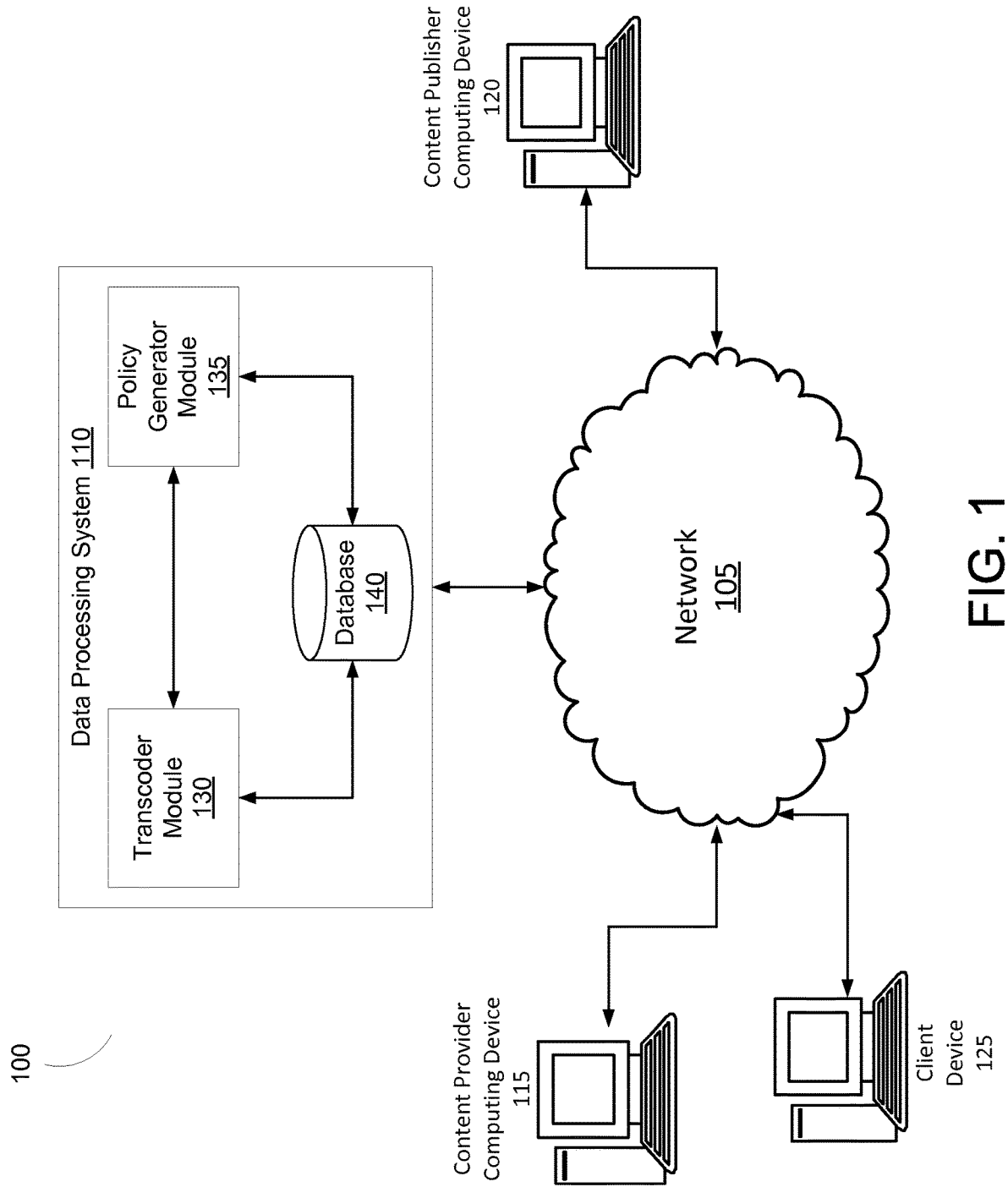
FIG. 1 is a block diagram depicting one implementation of an environment for converting FLASH content to HTML content in a computer network environment, according to an illustrative implementation.

Following below are more detailed descriptions of various concepts related to, and implementations of, methods, apparatuses, and systems of converting FLASH content to HTML content in a computer network environment. The various concepts introduced above and discussed in greater detail below may be implemented in any of numerous ways, as the described concepts are not limited to any particular manner of implementation.

Visual content, both raster and vector graphics, may be rendered on Internet-based resource pages (e.g., webpages) using the ADOBE FLASH format, such as a ShockWave FLASH (SWF) movie file or application. Each ADOBE FLASH file can correspond to visual content such as an content item (e.g., online ad on an webpage) to be served to a client device for presentation on an Internet-based resource page. Each ADOBE FLASH file can include instructions (e.g., compiled code) that can cause a computing device to generate or access a display list that can specify the composition of the visible elements for rendering the visual content. The display list can include a plurality of display objects, such as Shapes, Texts, MovieClips, and Bitmaps, among others, interconnected to one another in a hierarchical tree structure. Using the ADOBE FLASH format content to render visual content, however, can require much of the computer's resources resulting in quicker power consumption and can also raise Internet security issues. Some of these challenges may be addressed by converting ADOBE FLASH files to HyperText Markup Language (HTML) code and using the HTML code to render the visual content. One implementation may be to convert each display object of the display list to a HTML graphic and then directly render each of the converted graphic elements onto separate HTML canvas elements. This implementation, however, may also require much of the available computer's resources, thereby delaying other processes such as the loading or rendering of other elements on the webpage. Furthermore, from a human-computer interaction (HCI) perspective, the resultant latency may result in an adverse user experience while accessing the webpage.

To address these and other challenges, the present disclosure provides systems and methods for converting ADOBE FLASH content to HTML content by generating an HTML-based instruction list. A transcoder module can traverse the display objects of the display list of an ADOBE FLASH file. At each display object, the transcoder module can parse the display object to identify a class type of the display type. Examples of class types may include Shape, Text, MovieClip, and Bitmap, among others. Based on the identified class type, the transcoder module can generate a set of HTML-based instructions for the current display object. Examples of instructions may include a stack instruction, a clip instruction, a blend instruction, or a draw instruction. The stack instruction can specify that the visual element corresponding to the current display object is to be either clipped or blended with the visual element corresponding to the subsequent display object while rendering. The clip instruction can specify that the visual element corresponding to the current display object is to clip, filter, or truncate the visual element corresponding to the previous display object while rendering. The blend instruction can specify that the visual element corresponding to the current display object is to be blended with the visual element corresponding to the previous display object while rendering. The draw instruction can specify that the visual element corresponding to the current display object is to be rendered with the graphic (e.g., shape, bitmap, text, or video) specified. While traversing the display list, the transcoder module can insert each generated set of HTML-based instructions into an instruction list for rendering the visual content.

Additionally, an execution policy generator can create an execution policy to specify the web application to process the instructions of the instruction list according to a pre-defined sequence and timing. For example, the execution policy can specify that the web application is to execute each instruction when the web application is idle, while loading the webpage. The execution policy can also specify that the web application is to periodically execute some of the instructions during a specified timeout and then allow the web application to load the remainder of the webpage.

In the context of a computer networked environment, a data processing system (e.g., an ad server) can receive the FLASH-based content item (e.g., FLASH-based online ad) from a content publisher computing device or content provider computing device. Upon a request to convert the FLASH-based content item to an HTML-based content item, the data processing system can convert the FLASH-based content item to the HTML-based instruction by traversing the display objects of the display list corresponding to the FLASH-based content item and generating the sets of HTML-based instructions. In addition, upon request for content from a client device, the data processing system can transmit the instruction list along with the execution policy to the client device for rendering visual content on the information resource page.

By using the instruction list to render the visual content rather than individually converting and rendering each display object onto a canvas, the web application may be able to further preserve computer resources, thereby reducing the amount of power consumed by the computing device. Additionally, by executing the instruction list according to the execution policy, the resources of the web application may be freed up such that the web application may load the other elements on the webpage more quickly, thereby enhancing user's experience with the webpage.

At least one aspect is directed to a method of converting FLASH content to HyperText Markup Language (HTML) content. The method can include receiving, by a transcoder module executing on one or more processors, a FLASH-based content item including instructions that can cause a computing device to generate or access a display list comprising a first display object and a second display object. The method can include traversing the display list to identify a class type for the first display object. The method can include generating, by the transcoder module, a first set of HTML-based instructions based on the class type for the first display object. The method can include inserting the generated first set of HTML-based instructions into an instruction list. The method can include traversing the display list to identify a class type for the second display object. The method can include generating a second set of HTML-based instructions based on the class type for the second display object. The method can include inserting the generated second set of HTML-based instructions to the instruction list including the first set of HTML-based instructions. The method can include storing the instruction list in a data structure.

FIG. 1 is a block diagram depicting one implementation of an environment for converting FLASH content to HTML content. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one client device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as advertisements for display on information resources at the client device 125. The content provided by the content provider computing device 115 can include third party content items or creatives (e.g., ads) for display on information resources, such as a website or web page that includes primary content, e.g. content provided by the content publisher computing device 120. The content items can also be displayed on a search results web page. For instance, the content provider computing device 115 can provide or be the source of ads or other content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other client device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The client devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client devices 125 can be communication devices through which an end user can submit requests to receive content. The requests can be requests to a search engine and the requests can include search queries. In some implementations, the requests can include a request to access a web page.

The content provider computing devices 115, the content publisher computing device 120 and the client devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120, and the client devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the client devices 125 (e.g., a built-in display, microphone, etc.) or external to the housing of content provider computing devices 115, the content publisher computing device 120 and the client devices 125 (e.g., a monitor connected to the user computing device 115, a speaker connected to the user computing device 115, etc.), according to various implementations. For example, the content provider computing devices 115, the content publisher computing device 120 and the client devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one transcoder module 130, at least one policy generator module 135, and at least one database 140. The content item selection 130 and the policy generator module 135 each can include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the client device 125) via the network 105.

The transcoder module 130 and the policy generator module 135 can include or execute at least one computer program or at least one script. The transcoder module 130 and the policy generator module 135 can be separate components, a single component, or part of the data processing system 110, content provider computing device 115, content publisher computing device 120, or client device 125. The transcoder module 130 and the policy generator module 135 can include combinations of software and hardware, such as one or more processors configured to execute one or more scripts.

The data processing system 110 can also include one or more content repositories or databases 140. The databases 140 can be local to the data processing system 110. In some implementations, the databases 140 can be remote to the data processing system 110 but can communicate with the data processing system 110 via the network 105. The databases 140 can include web pages, FLASH-formatted visual content, and instruction lists for rendering HTML-based visual content, among others, to serve to a client device 125. In some implementations, the web pages, portions of webpages, and content items (e.g., advertisements) can include those illustratively depicted in FIG. 2. Additional details of the contents of the database 140 will be provided below.

The transcoder module 130 can receive a FLASH-based content item including instructions to cause a computing device to generate or access a display list. In some implementations, the transcoder module 130 can receive the FLASH-based content item in the form of a file or one or more packets. In some implementations, the transcoder module 130 can receive the FLASH-based content item from the content provider computing device 115, the content publisher computing device 120, the client device 125, or an input device connected to the data processing system 110. The FLASH-based content item can be, for example, such as a SHOCKWAVE FLASH (SWF) file format, a FLASH VIDEO (FLV, F4V, F4P, F4A, F4P or SWC) file format, a FLASH ACTIONSCRIPT (AS, ASC, ABC, ASO) file format, an ACTION MESSAGE (AMF) format file, or any other FLASH file format used to render visual content.

The display list can comprise one or more display objects arranged hierarchically, such as in a tree structure. For example, the display list can include a first display object and a second display object. In this example, the second display object can be a child of the first display object. Each of the one or more display objects can represent a visual element or constituent of the visual content rendered using the FLASH-based content item. All of the one or more display objects included in the display list can be inherited from a DisplayObject class. Types of display objects derived using the DisplayObject class can be a stage (Stage class), a display object container (DisplayObjectContainer class), and other types of display objects, such as a Bitmap class, Shape class, Sprite class, MovieClip class, TextField class, TextLine class, StaticText class, and Video class among others. The display object container can include one or more other display objects (e.g., children display objects) arranged hierarchically within the display list, such as a subset of the tree structure. It should be appreciated that some of the derived display objects can also be display object containers. For example, MovieClip and Sprite display objects can be a display object container including one or more other children display objects.

The transcoder module 130 can traverse the display list to identify a class type of a display object. In some implementations, the transcoder module 130 can traverse the display list in one of a pre-order (e.g., root, left subtree, then right subtree), in-order (e.g., left subtree, root, then right subtree), or post-order (left subtree, right subtree, then root). For example, the transcoder module 130 can traverse the display list to identify the class type of the current display object. The transcoder module 130 can then traverse the display list by invoking "getChildAt(i)" function and iteratively incrementing the index "i" to retrieve the display objects of the display list to identify the class types of the children display objects of the current display object. Once the child display object of the display list has been retrieved, the transcoder module 130 can determine whether the current display object is of a specific class type by invoking the "trace( )" function. In this example, to determine whether the display object is a TextField display object, the transcoder module 130 can invoke "trace(cur_object is TextField)" to obtain a Boolean value indicating whether the current display object is a TextField display object. In some implementations, the transcoder module 130 can identify the class type of the display object as one of a Bitmap, a Shape, a Sprite, a MovieClip, a TextField, a TextLine, a StaticText class, and a Video class among others.

In some implementations, the transcoder module 130 can determine whether the display object is a display object container. For example, the transcoder module 130 can invoke the "trace( )" function to determine whether the current display object is a display object container. Class types that can be a display object container include a MovieClip class, TextLine class, and Sprite class, among others. In some implementations, the transcoder module 130 can determine whether the display object container includes one or more children display objects, responsive to determining that the display object is the display object container. In some implementations, the transcoder module 130 can identify the class type for each of the one or more children display objects of the display object container. In some implementations, the transcoder module 130 can determine whether the display object is a MovieClip display object container or a Sprite display object container. The MovieClip display object container can include one or more children display objects arranged in a timeline. The Sprite display object container can include one or more children display objects. The TextLine display object container can include one or more children display objects. In some implementations, the transcoder module 130 can identify the class type for each of the one or more children display objects of the MovieClip display object container. In some implementations, the transcoder module 130 can identify an external FLASH content item referenced by the MovieClip display object container. In some implementations, the transcoder module 130 can identify the class type for each of the one or more children display objects of the Sprite display object container.

The transcoder module 130 can generate a set of HTML-based instructions based on the class type for the display object. In some implementations, the transcoder module 130 can generate another set of HTML-based instructions based on the class types for each of the children display objects of the display object, responsive or subsequent to determining that the display object is a display object container. The set of HTML-based instructions can be at least one of a set of draw bitmap instructions, a set of draw text instructions, a set of draw shape instructions, a set of stack instructions, a set of blend instructions, a set of clip instructions, a set of filter instructions, and a set of draw video instructions, among others. The set of draw bitmap instructions can specify that the visual element corresponding to the display object is to be drawn with the graphic specified by the display object. The set of draw text instructions can specify that the visual element corresponding to the display object is to be drawn with the text string specified by the display object. In some implementations, the set of draw instructions can include a set of draw edit-text instructions and a set of draw static-text instructions. The set of draw shape instructions can specify that the visual element corresponding to the display object is to be drawn with the shape specified by the display object. The set of stack instructions can specify that the visual element corresponding to the display object is to be drawn (e.g., bitmap, text, or shape) and clipped or blended with another visual element corresponding to another display object while rendering. The set of blend instructions can specify that the visual element corresponding to the display object is to be blended with another visual element corresponding to the display object while rendering. The set of clip instructions can specify that the visual element corresponding to the display object is to clip or truncate another visual element corresponding to another display object while rendering. In some implementations, the set of clip instructions can include a set of start clipping instructions, a set of apply clipping instructions, and a set of end clipping instructions. The set of filter instructions can specify that the visual element corresponding to the display object is to be filtered while rendering. The set of draw video instructions can specify that video visual elements corresponding to the display object is to be drawn, rendered, or otherwise played in accordance to specifications of the video data of display object.

The set of HTML-based instructions can include HTML code (e.g., HTML5 markup). In some implementations, the set of HTML-based instructions can include JavaScript code (e.g., using the "<script> . . . </script>" tags) and Cascading Style Sheets (CSS) markup. The set of HTML-based instructions can cause an application (e.g., web browser) to render the same visual content as the FLASH-based content item. It should be appreciated that executing the set of HTML-based instructions to render the visual content may save computer resources (e.g., CPU and memory use) as compared to executing the FLASH-based content item to render the same visual content. Thus, executing the set of HTML-based instructions may lower power consumption and allow the computing device to be available for other processes. Furthermore, the sharing of a single, generated set of HTML-based instructions to render the visual content across multiple computing devices may lead to even greater savings in computer resources and power consumption.

In some implementations, responsive to identifying that the class type of the display object is a Bitmap class, transcoder module 130 can generate a set of draw bitmap instructions. In some implementations, the transcoder module 130 can identify a Bitmap data corresponding to the display object. The Bitmap data can include raster graphics data from an external image file or source of any raster graphics format, such as the Bitmap (BMP) format file, Portable Network Graphics (PNG) format file, Tagged Image File Format (TIFF) format file, Joint Photographic Experts Group (JPEG) format file, and Graphics Interchange Format (GIF), among others. In some implementations, the transcoder module 130 can identify a location for the external image file or source. The location for the external image file or source can include a file path name on a storage of a computing device (e.g., storage of computer system 400) or a Uniform Resource Locator (URL) identifying a computer network location (e.g., "https://www.example.com/example.BMP"). In some implementations, the transcoder module 130 can identify one or more alterations to the Bitmap data. The one or more alterations can be specified by the display object outside the external image file. The one or more alterations can include, for example, skewing the dimensions or resolution of the Bitmap data, manipulating pixels of the Bitmap data, specifying the transparency of the Bitmap data, and changing the color scheme of the Bitmap data, among others. In some implementations, the transcoder module 130 can generate the set of draw shape instructions for the Bitmap data including the "<img>" tag, "src" tag specifying the source of the Bitmap data, and an "alt" tag specifying an alternate name or text for the Bitmap data. In some implementations, the transcoder module 130 can generate the draw shape instructions for the one or more alterations to the Bitmap data using HTML-based code equivalent to the one or more alterations. For example, if the display object specifies that an alpha (e.g., opacity) of the Bitmap data is 50%, the transcoder module 130 can generate the HTML-based code including "bmp.globalAlpha=0.5."

In some implementations, responsive to identifying that the class type of the display object is a TextField, TextLine, or StaticText class, the transcoder module 130 can generate a set of draw text instructions. In some implementations, responsive to identifying that the class type of the display object is a TextField or TextLine class, the transcoder module 130 can generate a set of draw edit-text instructions. In some implementations, responsive to identifying that the class type of the display object is a TextField, TextLine, or StaticText class, the transcoder module 130 can generate a set of draw static-text instructions. In some implementations, the transcoder module 130 can identify text data corresponding to the display object. The text data can include any string included in a text field of the display object. In some implementations, the transcoder module 130 can generate the set of draw static-text instructions for the text data using the string included in the text field of the display object. For example, if the text field of the display object includes the string "XYZ," the transcoder module 130 can generate the set of draw static-text instructions to include the code, "txt.filltext("XYZ")." In some implementations, the transcoder module 130 can identify one or more properties of the text data. For example, the one or more properties of the text field can include font, size, color, rotation, scale, and background color, among others. In some implementations, the transcoder module 130 can generate the set of draw edit-text instructions for the one or more alterations to the text data using HTML-based code equivalent to the one or more alterations. For example, if the display object specifies that the font of the text is "Comic Sans," the size 20 pixels, and justified to the center of the element, the transcoder module 130 can generate the set of edit text instructions to include the code "txt.font="20px Comic Sans MS"" and "txt.textAlign="center"."

In some implementations, responsive to identifying that the class type of the display object is a Shape class, the transcoder module 130 can generate a set of draw shape instructions. In some implementations, the transcoder module 130 can identify Shape data corresponding to the display object. The Shape data can include a shape (e.g., rectangle, circle, and line), one or more reference points (e.g., end points, anchor points, end points, and coordinates), color, fill, gradient, opacity, rotation, scale, and curve, among others. In some implementations, the transcoder module 130 can generate the set of draw shape instructions for the Shape data using HTML-based code equivalent to the Shape data. For example, if the display object specifies that the shape is a rectangle at a pixel position of (30, 40) and a pixel size of (60×20) using the FLASH-based code "shape.graphics.drawRect(30, 40, 60, 20)," the transcoder module 130 can generate the HTML-based code for the set of draw shape instructions including "shp.fillRect(30, 40, 60 20)." In this example, if the display object specifies that the rectangle is to be filled with a radial gradient linear from blue to white, the transcoder module 130 can generate the draw shape instruction with the HTML-based code including the "createLinearGradient( )" function specifying the respective color range.

In some implementations, responsive to identifying that the class type of the display object is a MovieClip class or a Sprite class, the transcoder module 130 can generate the set of HTML-based instructions for each of the one or more children display objects of the MovieClip display object container or of the Sprite display object container. It should be appreciated that the MovieClip class may be a derived class of the Sprite class, including many of the same properties and functions. In some implementations, the transcoder module 130 can generate a stack instruction corresponding to the stage display object of the MovieClip display object container or the Sprite display object container. The one or more children display objects can include display objects of other display object classes, such as the Bitmap class, Shape class, TextField class, TextLine class, and StaticText class. At least one of the one or more children display objects can be a first child display object and at least one other of the one or more children display objects can be a second child display object. As discussed above, the transcoder module 130 can identify the class type for each of the one or more children display objects of the MovieClip display object container or of the Sprite display object container. In some implementations, the transcoder module 130 can generate the set of HTML-based instructions for each of the one or more children display objects based on the class type identified for the respective frame display object. For example, the transcoder module 130 can generate the set of HTML-based instructions for the respective frame display object using the functionalities described above.

In some implementations, the transcoder module 130 can generate a set of blend instructions for the MovieClip display object container or the Sprite display object container. In some implementations, the transcoder module 130 can identify a blend mode from the one or more children display objects of the MovieClip display object container or the Sprite display object container. In some implementations, the transcoder module 130 can identify the blend mode, responsive or subsequent to generating the set of HTML-based instructions for each of the one or more children display objects or each of the one or more children display objects. Examples of blend modes can include normal (BlendMode.NORMAL), layer (BlendMode.LAYER), multiply (BlendMode.MULTIPLY), screen (BlendMode.SCREEN), lighten (BlendMode.LIGHTEN), darken (BlendMode.DARKEN), difference (BlendMode.DIFFERENCE), add (BlendMode.ADD), subtract (BlendMode.SUBTRACT), invert (BlendMode.INVERT), alpha (BlendMode.ALPHA), erase (BlendMode.ERASE), overlay (BlendMode.OVERLAY), hardlight (BlendMode.HARDLIGHT), and shader (BlendMode.SHADER), among others. In some implementations, the transcoder module 130 can generate the set of blend instructions to include HTML-based code equivalent to the blend mode identified from the MovieClip display object container or the Sprite display object container. For example, if the blend mode specifies that two of the visual elements each corresponding to two children display objects associated with the MovieClip display object container or the Sprite display object container is to have color values inverted, multiplied, and inverted again (e.g., BlendMode.screen), the transcoder module 130 can generate the set of blend instructions to include "cur_canvas.globalCompositeOperation=screen." In this example, the two children display objects may be children display objects of the MovieClip display object container or the Sprite display object container and the transcoder module 130 can have generated the set of HTML-based instructions prior to generating the set of blend instructions.

In some implementations, the transcoder module 130 can generate a set of clip instructions for the MovieClip display object container or the Sprite display object container. In some implementations, the transcoder module 130 can identify at least two of the children display objects from the MovieClip display object container or the Sprite display object container. In some implementations, the at least three children display objects can correspond to a first child display object, a second child display object, and a third child display object. In some implementations, the transcoder module 130 can identify that a visual element corresponding to the first child display object is to truncate or mask a visual element corresponding to the second child display object. In some implementations, the transcoder module 130 can identify that a visual element corresponding to the first child display object is to truncate or mask a visual element corresponding to the second child display object. In some implementations, the transcoder module 130 can identify that a visual element corresponding to the third child display object is to un-truncate or de-mask the visual element corresponding to the second child display object. In some implementations, the transcoder module 130 can generate a set of start clipping instructions corresponding to the first child display object. In some implementations, the transcoder module 130 can generate a set of apply clipping instructions corresponding to the second child display object. In some implementations, the transcoder module 130 can generate a set of end clipping instructions corresponding to the third child display object.

In some implementations, the transcoder module 130 can identify a filter from the one or more children display objects of the MovieClip display object container or the Sprite display object container. In some implementations, the transcoder module 130 can identify the filter, responsive or subsequent to generating the set of HTML-based instructions for each of the one or more children display objects. Examples of filters can include bevel (BevelFilter), blur (BlurFilter), drop shadow (DropShadowFilter), glow (GlowFilter), gradient bevel (GrandientBevelFilter), gradient glow (GradientGlowFilter), color matrix (ColorMatrixFilter), convolution (ConvolutionFilter), displacement (DisplacementMapFilter), and shader (ShaderFilter), among others. In some implementations, the transcoder module 130 can generate the set of clip instructions to include HTML-based code equivalent to the filter identified from the MovieClip display object container. In some implementations, the transcoder module 130 can access a library of HTML-based code filters from the database 140 to identify the HTML-based code equivalent to the filter identified from the MovieClip display object container or the Sprite display object container. For example, if the filter identified from the MovieClip display object container or the Sprite display object container is a drop shadow filter, the transcoder module 130 can search the database 140 for a drop shadow filter written in HTML-based code (e.g., JavaScript, CSS, or HTML).

In some implementations, responsive to identifying that the class type of the display object is a Video class, the transcoder module 130 can generate a set of draw video instructions. In some implementations, the transcoder module 130 can identify video data corresponding to the display object. The video data can include a resolution, cue point, encoding type, frame information, and key frame information, among others. The resolution can include width and height of video visual content corresponding to the display object. The cue point can include times or frames at which to trigger other actions. The encoding type can include, for example, video format (e.g., H.264, SPARK) and container (e.g., FLV, MP4, MP3, or F4V). The frame information can include visual content data for each frame of the video visual content corresponding to the display object. The key frame information can include processing data for each of the frames following a particular frame within the video visual content. In some implementations, the transcoder module 130 can identify a location for an external video file or source to include into the set of draw video instructions. In some implementations, the transcoder module 130 can identify a location for an external video stream source to include into the set of draw video instructions. In some implementations, the transcoder module 130 can generate HTML-based code equivalent to the frame information and key information to include into the set of draw video instructions. For example, if the video class display object specifies that the frames within the video visual content are to be smoothed by interpolation, the transcoder module 130 can access a library of HTML-based code for processing visual content to search for HTML-based code equivalent to the interpolation specified in the video display object and include into the set of draw video instructions.

The transcoder module 130 can insert the set of HTML-based instructions into an instruction list. The instruction list can be any data structure. The data structure can be, for example, an array, a matrix, a graph, a tree, a queue, a stack, a linked list, a skip list, and a struct, among others. In some implementations, the transcoder module 130 can stack the set of HTML-based instructions to a stack of the instruction list. In some implementations, the transcoder module 130 can append the set of HTML-based instructions to the instruction list. In some implementations, the transcoder module 130 can append, add, or otherwise enqueue the set of HTML-based instructions to the instruction list. In some implementations, the transcoder module 130 can insert the set of HTML-based instructions into the instruction list, subsequent to inserting another set of HTML-based instructions corresponding to a child display object into the instruction list. For example, the transcoder module 130 can generate and insert a first set of HTML-based instructions corresponding to a display object container into the instruction list, then generate and insert a second set of HTML-based instructions corresponding to the left child display object into the instruction list, and finally generate and insert a third set of HTML-based instructions corresponding to the right child display object into the instruction list.

The transcoder module 130 can identify another display object in the display list. The transcoder module 130 can repeat the functionality detailed above for each of the other display objects identified in the display list. For example, subsequent to inserting the set of HTML-based instructions for a first display object of the display list to the instruction list, the transcoder module 130 can identify a class type for a second display object, generate a second set of HTML-based instructions based on the identified class type for the second display object, and insert the second set of HTML-based instructions to the instruction list. The transcoder module 130 can then again determine whether there are more display objects in the display list, and repeat the functionality detailed above. It should be appreciated that this functionality may be repeated by the transcoder module 130 multiple times for each of the display objects in the display list.

The transcoder module 130 can store the instruction list in a data structure onto the database 140. In some implementations, the transcoder module 130 can store the instruction list onto the database 140, while traversing the display list. For example, the transcoder module 130 can store the instruction list onto the database 140 as the transcoder module 130 generates each of the sets of HTML-based instructions. In some implementations, the transcoder module 130 can create or instantiate a HTML-based content item. In some implementations, the transcoder module 130 can generate HTML code based on the sets of HTML-based instructions of the instruction list for writing onto the HTML-based content item. For example, the transcoder module 130 can create an HTML file corresponding to an HTML-based content item and write HTML code based on a set of HTML-based instructions onto the HTML file.

The policy generator 135 can generate an execution policy for rendering visual content. The execution policy can specify an application (e.g., web browser or program executing on a client device 125) to execute the sets of HTML-based instructions in the instruction list based on a trigger condition. In some implementations, the policy generator 135 can generate the execution policy concurrent to, independent of, prior to, or subsequent to generating the sets of HTML-based instructions. In some implementations, the policy generator 135 can insert the execution policy into the HTML-based content item that includes the instruction list. In some implementations, the policy generator 135 can insert the execution policy into the instruction list. In some implementations, the policy generator 135 can store the execution policy onto the database 140.

In some implementations, the trigger condition can specify that the application is to execute at least one of the sets of HTML-based instructions, responsive to determining that the application is idle. In some implementations, the trigger condition can specify that the application is to execute at least one of the sets of HTML-based instructions within a predetermined time window, subsequent to determining that the application is idle. In some implementations, the trigger condition can specify that the application is monitor for a remaining idle time period to execute at least one of the sets of HTML-based instructions and stop execution of the set of HTML-based instructions when the application detects the remaining idle time period is below a predetermined threshold. For example, if the instruction list include a first set of HTML-based instructions and a second set of HTML-based instructions, an application rendering the visual content using the instruction list can execute the first set of HTML-based instructions while the application is idle run other processes (e.g., other elements on a web page). The application can then wait until completing the execution of other processes. Once the application has determined that it is idle, the application can then execute the second set of HTML-based instructions in the instruction list. In this example, the application can determine that the application is idle by invoking the "requestIdleCallback( )" function. The application can then execute some of the sets of HTML-based instruction in the instruction list either during a predetermined time window or until the application determines that the application is no longer idle again.

In some implementations, the trigger condition can specify that the application is to execute at least one of the sets of HTML-based instructions, responsive to determining that a time duration of executing at least one of the sets of HTML-based instructions exceeds a predefined time delay. For example, if the instruction list includes a first set of HTML-based instructions and a second set of HTML-based instructions, an application rendering the visual content using the instruction list can execute the first set of HTML-based instructions in a first time duration and subsequent execute the second set of HTML-based instructions in a second time duration. In this example, both the first time duration and the second time duration can be specified by invoking the "setTimeout( )" function.

In some implementations, the policy generator 135 can group the HTML-based instructions in the instruction list based on a weight for each of the sets of the HTML-based instructions. Each of the weights for the sets of HTML-based instructions can be predetermined based on a priority of rendering. For example, weights for sets of draw text instructions can be set to be greater than the weights for sets of draw shape instructions, indicating a higher priority of drawing text while rendering the visual content. In some implementations, the weights for each of the sets of the HTML-based instructions may be used to group or otherwise partition executions of one or more sets of the HTML-based instructions. For example, if the weights for the sets of filter instructions are the same as sets of blend instructions but different from the sets of draw text instructions, a computing device executing the instruction can execute the filter instructions and the blend instructions separately from the draw text instructions.

In some implementations, the data processing system 110 can transmit the instruction list and the execution policy to the content provider computing device 115, content publisher computing device 120 or client device 125. In some implementations, the data processing system 110 can access the instruction list and the execution policy from the database 140. In some implementations, the data processing system 110 can transmit the instruction list, responsive to receiving a request for content. In some implementations, the data processing system 110 can transmit the instruction list in a HTML-based content item for presentation on an information resource (e.g., webpage). In some implementations, the HTML-based instructions can cause a computing device (e.g., the content provider computing device 115, content publisher computing device 120 or client device 125) to execute the instruction list to render visual content in accordance with an execution policy. The execution policy includes one or more rules or instructions according to which the instructions in the instruction list can be executed by the computing device. For example, the data processing system 110 can transmit the instruction list, responsive to receiving a request for content from a client device 125. The request may have been sent by the client device 125 while loading a web page including visual content. Subsequent to receiving the instruction list, the client device 125 can render visual content by executing the sets of HTML-based instructions. The client device 125 can execute the sets of HTML-based instructions in accordance with the execution policy.

In some implementations, the transcoder module 130 can be implemented using the following pseudo-code:

```
InstructionGenerator {
    var instructions = [ ];
    function visitBitmap(bitmap) {
        enqueueInstruction(DRAW_BITMAP, bitmap);
    }
    function visitText(text) {
        enqueueInstruction(DRAW_TEXT, bitmap);
    }
```

-continued

```
function visitMovieClip(displayObject) {
    if (displayObject.isLayer( )) {
        enqueueInstruction(STACK_LAYER);
        processList(displayObject.getDisplayList( ));
        enqueueInstruction(CLIP_LAYER,
            displayObject.getMasks);
        enqueueInstruction(FILTER_LAYER,
            displayObject.getFilters( ));
        enqueueInstruction(BLEND_LAYER,
            displayObject.getBlends( )); }
    else {
        processList(displayObject.getDisplayList( ));
    }
}
function visitShape(shape) {
    enqueueInstruction(DRAW_SHAPE, bitmap);
}
function processList(displayList) {
    var activeMask = [ ];
    for (child : displayList) {
        while (activeMask.length > 0 &&
            child.depth > activeMask.top( )) {
            activeMask.pop( );
            enqueueInstruction(APPLY_CLIP);
        }
        if (child.isClip( )) {
            activeMask.push(child.depth);
            enqueueInstruction(START_CLIP);
            child.accept(this);
                enqueueInstruction(END_CLIP); }
            else {
                child.accept(this);
            }
        }
    }
}
```

In some implementations, the policy generator module 135 can be implemented using the following pseudo-code:

```
Renderer {
// Process instructions while available and before timeout
    function processInstructions(instructions, timeout) {
        while (currentTime < timeout &&
            instructions.length) {
            var instruction = instructions.dequeue( );
            // Do actual instruction work }
        }
// Trigger the processing of instructions for a time, and the
schedules the next batch and returns to the browser time out
    function doInstructions(instructions, renderer) {
        renderer.processInstructions(instructions,
        currentTime + CHUNCK_TIME);
        while (instructions.length) {
            window.setTimeout(doInstructions.bind(instructions,
                renderer)); }
        else {
            // Finished. Copy the backbuffer to the canvas
            canvas.copy(renderer.canvas);
        }
    }
}
```

In some implementations, the data processing system 110 can invoke the functionalities of the transcoder module 130 and the policy generator module 135 and render the generated instruction list and execution policy using the following pseudo-code:

```
var instructionGenerator = new InstructionGenerator( );
// generates the instructions
stage.accept(instructionGenerator);
// The first layer is a back buffer
var renderer = Renderer(new canvas);
```

-continued

```
doInstructions(instructionGenerator.instructions,
    renderer);
```

Figure 2:
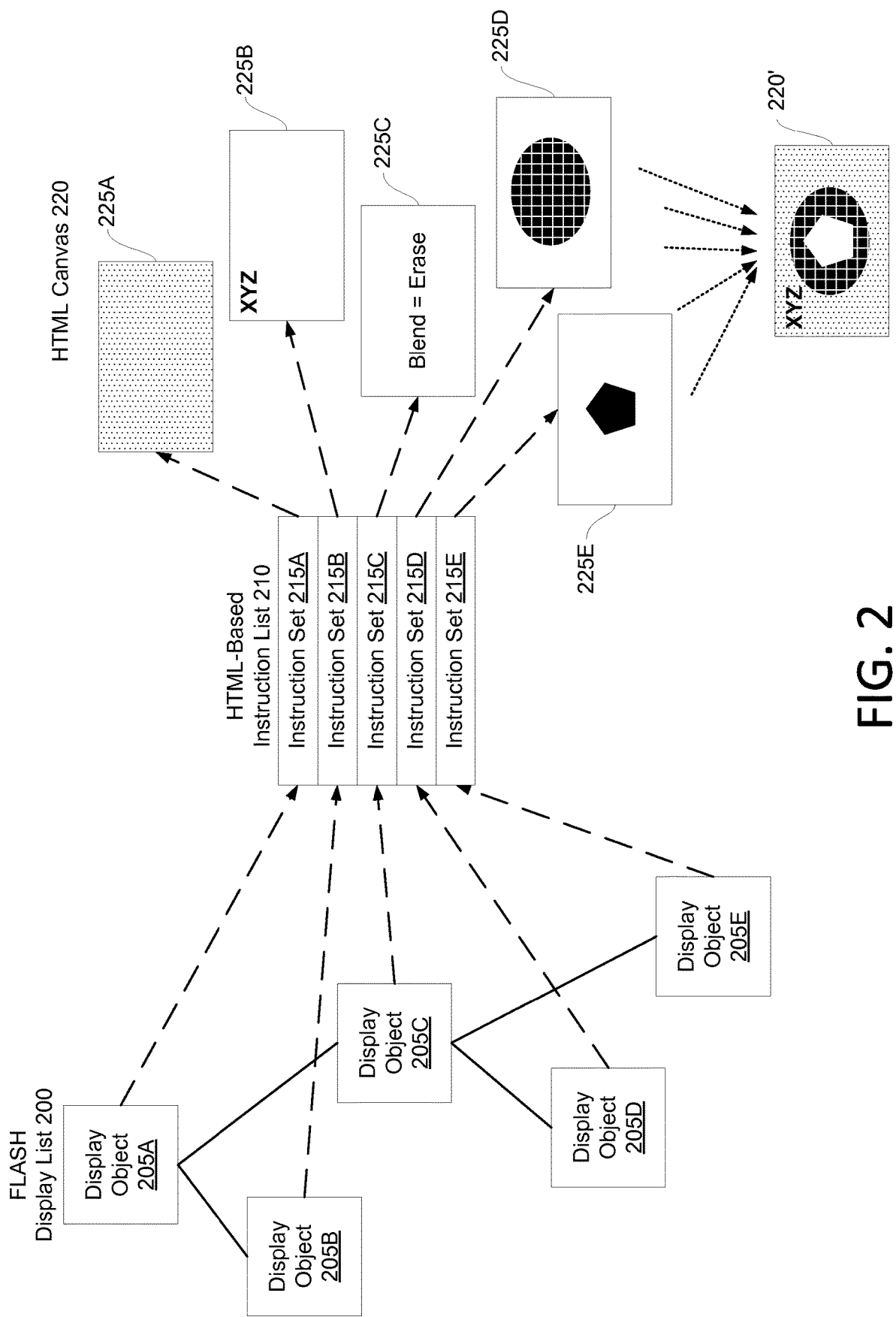
FIG. 2 is a process diagram depicting one implementation of converting FLASH content to HTML content, according to an illustrative implementation.

Now referring to FIG. 2 in the context of the system 100 described in conjunction with FIG. 1, FIG. 2 is a process diagram depicting one implementation of converting FLASH content to HTML content. In this example, the FLASH display list 200 can include five display object 205A-E, each corresponding to a visual element constituting the visual content. Display object 205A may be a display object container for display objects 205B and 205C. In turn, display object 205C may be a display object container for display objects 205D and 205E. Display object 205A may be a Bitmap display object and the visual element corresponding to display object 205A may include a dotted background. Display object 205B may be a StaticText display object and the visual element corresponding to display object 205B may include the string "XYZ" to be displayed generally toward the upper left corner of the visual content. Display object 205C may be a MovieClip display object specifying that the children display object 205D and 205E are to be blended together by erasure (e.g., BlendMode.ERASE). Display object 205D may be a Shape display object and the visual element corresponding to the display object 205C may include an elliptical shape filled with a tiled pattern. Display object 205E may be a Bitmap display object and the visual element corresponding to the display object 205D may include a filled pentagon shape.

In the context of FIG. 2, the transcoder module 130 can traverse the display list 200. For each display object 205A-E in the display list 200, the transcoder module 130 can identify the class type. In this example, the transcoder module 130 can identify that display object 205A is a Bitmap display object, display object 205B is a StaticText display object, display object 205C is a MovieClip display object, display object 205D is a Shape display object, and display object 205E is a Bitmap display object. The transcoder module 130 can transform data from one format to another format. Using the identified class types of each of the display objects 205A-E, the transcoder module 130 can transform the FLASH content corresponding to the display list 200 to HTML-based content (e.g., HTML5, JavaScript, and CSS) corresponding to a HTML-based instruction list 210. The transcoder module 130 can generate a respective set of HTML-based instructions 215A-E for each of the display objects 205A-E based on the respective class type. The transcoder module 130 can then insert the sets of HTML-based instructions 215A-E into the HTML-based instruction list 210. In this example, the transcoder module 130 can generate a set of draw bitmap instructions 215A for display object 205A, a set of draw text instructions 215B for display object 205B, a set of blend instructions 215C for display object 205C, a set of draw shape instructions 215D for display object 205D, a set of draw bitmap instructions 215E for display object 205E. With the FLASH content transformed into HTML-based content, the transcoder module 130 can then store the HTML-based instruction list 210 onto a database 140. The policy generator 135 can generate an execution policy for the HTML-based instruction list 210 and store the execution policy also onto the database 140. The data processing system 100 can transmit the HTML-based instruction list 210, responsive to receiving a request from the client device 125.

Subsequent to receiving the HTML-based instruction list 210, an application (e.g., web browser or mobile application) running on the client device 125 can execute the sets of HTML-based instructions 215A-E of the HTML-based instruction list 210 to render visual content on a web page. In this example, the client device 125 can render each of the sets of HTML-based instructions 215A-E sequentially onto an HTML canvas 220. Each of the sets of HTML-based instructions 215A-E may correspond to a visual element 225A-E. The application can render the first visual element 225A that includes a dotted background corresponding to the first set of HTML-based instructions 215A. The application can then render the second visual element 225B that includes the string "XYZ" generally toward the upper left corner of the canvas 220 corresponding to the second set of HTML-based instructions 215B. The application can then process the third set of HTML-based instructions 215C to blend the next two visual elements 225C. The application can then render the fourth visual element 225D that includes an elliptical shape filled with a tiled pattern corresponding to the fourth set of HTML-based instructions 215D. The application can then render the fifth visual element 225E that includes a pentagon shape corresponding to the fifth set of HTML-based instructions 215E while applying the blend specified by the third set of HTML-based instructions 215C. It should be appreciated that visual elements 225A-E may be rendered on the same HTML canvas 220. In the end, the application can have rendered all the visual content onto the resultant HTML canvas 220'.

Figure 3:
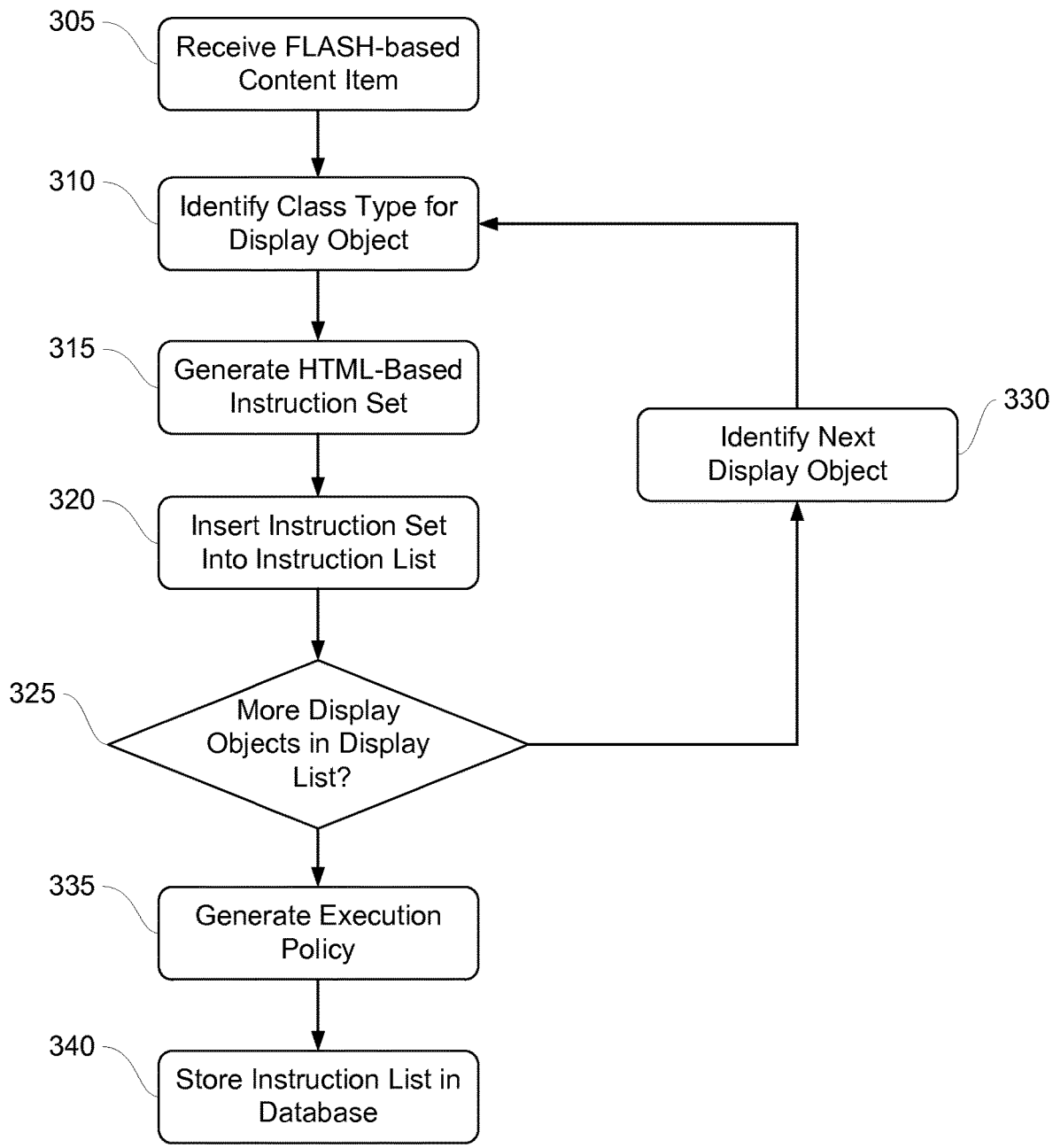
FIG. 3 is a flow diagram depicting a method of converting FLASH content to HTML content, according to an illustrative implementation.

Referring to FIG. 3, FIG. 3 is a flow diagram depicting a method 300 of converting FLASH content to HTML content. The functionality described herein with respect to method 400 can be performed or otherwise executed by transcoder module 130 and the policy generator module 135 of the data processing system 110, content provider computing device 115, or content publisher computing device 120, or client device 125 as shown in FIG. 1, or the computer system 400 depicted in FIG. 4, or any combination thereof. In brief overview, a computing system can receive a FLASH-based content item (BLOCK 305). The computing system can identify a class type for a display object (BLOCK 310). The computing system can generate a set of HTML-based instructions (BLOCK 315). The computing system can insert the set of HTML-based instructions (BLOCK 320). The computing system can determine whether there are more display objects in the display list (BLOCK 325). The computing system can identify a next display object in the display list (BLOCK 330). The computing system can generate an execution policy (BLOCK 335). The computing system can store the instruction list in a database (BLOCK 340).

In further detail, the computing system can receive a FLASH-based content item (BLOCK 305). In some implementations, the computing system can receive a FLASH-based content item including instructions to cause a computing device to generate or access a display list. In some implementations, the computing system can receive the FLASH-based content item in the form of a file or one or more packets. In some implementations, the computing system can receive the FLASH-based content item from the content provider computing device, the content publisher computing device, the client device, or an input device connected to the computing system. The FLASH-based content item can be, for example, such as a SHOCKWAVE FLASH (SWF) file format, a FLASH VIDEO (FLV, F4V, F4P, F4A, F4P or SWC) file format, a FLASH ACTION-SCRIPT (AS, ASC, ABC, ASO) file format, an ACTION MESSAGE (AMF) format file, or any other FLASH file format used to render visual content.

The display list can comprise one or more display objects arranged hierarchically, such as in a tree structure. For example, the display list can include a first display object and a second display object. In this example, the second display object can be a child of the first display object. Each of the one or more display objects can represent a visual element or constituent of the visual content rendered using the FLASH-based content item. All of the one or more display objects included in the display list can be inherited from a DisplayObject class. Types of display objects derived using the DisplayObject class can be a stage (Stage class), a display object container (DisplayObjectContainer class), and other types of display objects, such as a Bitmap class, Shape class, Sprite class, MovieClip class, TextField class, TextLine class, StaticText class, and Video class among others. The display object container can include one or more other display objects (e.g., children display objects) arranged hierarchically within the display list, such as a subset of the tree structure. It should be appreciated that some of the derived display objects can also be display object containers. For example, MovieClip and Sprite display objects can be a display object container including one or more other display objects.

The computing system can identify a class type for a display object (BLOCK 310). In some implementations, the computing system can traverse the display list in one of a pre-order (e.g., root, left subtree, then right subtree), in-order (e.g., left subtree, root, then right subtree), or post-order (left subtree, right subtree, then root). For example, the computing system can traverse the display list to identify the class type of the current display object. The computing system can then traverse the display list by invoking "getChildAt(i)" function and iteratively incrementing the index "i" to retrieve the display objects of the display list to identify the class types of the children display objects of the current display object. Once the child display object of the display list has been retrieved, the computing system can determine whether the current display object is of a specific class type by invoking the "trace( )" function. In this example, to determine whether the display object is a TextField display object, the computing system can invoke "trace(cur_object is TextField)" to obtain a Boolean value indicating whether the current display object is a TextField display object. In some implementations, the computing system can identify the class type of the display object as one of a Bitmap, a Shape, a Sprite, a MovieClip, a TextField, a TextLine, a StaticText class, and a Video class among others.

In some implementations, the computing system can determine whether the display object is a display object container. For example, the computing system can invoke the "trace( )" function to determine whether the current display object is a display object container. Class types that can be a display object container include a MovieClip class, TextLine class, and Sprite class, among others. In some implementations, the computing system can determine whether the display object container includes one or more children display objects, responsive to determining that the display object is the display object container. In some implementations, the computing system can identify the class type for each of the one or more children display objects of the display object container. In some implementations, the computing system can determine whether the display object is a MovieClip display object container or a Sprite display object container. The MovieClip display object container can include one or more children display objects arranged in a timeline. The Sprite display object container can include one or more children display objects. The TextLine display object container can include one or more children display objects. In some implementations, the computing system can identify the class type for each of the one or more children display objects of the MovieClip display object container. In some implementations, the computing system can identify an external FLASH content item referenced by the MovieClip display object container. In some implementations, the computing system can identify the class type for each of the one or more children display objects of the Sprite display object container.

The computing system can generate a set of HTML-based instructions (BLOCK 315). In some implementations, the computing system can generate a set of HTML-based instructions based on the class type for the display object. In some implementations, the computing system can generate another set of HTML-based instructions based on the class types for each of the children display objects of the display object, responsive or subsequent to determining that the display object is a display object container. The set of HTML-based instructions can be at least one of a set of draw bitmap instructions, a set of draw text instructions, a set of draw shape instructions, a set of stack instructions, a set of blend instructions, a set of clip instructions, a set of filter instructions, and a set of draw video instructions, among others. The set of draw bitmap instructions can specify that the visual element corresponding to the display object is to be drawn with the graphic specified by the display object. The set of draw text instructions can specify that the visual element corresponding to the display object is to be drawn with the text string specified by the display object. In some implementations, the set of draw instructions can include a set of draw edit-text instructions and a set of draw static-text instructions. The set of draw shape instructions can specify that the visual element corresponding to the display object is to be drawn with the shape specified by the display object. The set of stack instructions can specify that the visual element corresponding to the display object is to be drawn (e.g., bitmap, text, or shape) and clipped or blended with another visual element corresponding to another display object while rendering. The set of blend instructions can specify that the visual element corresponding to the display object is to be blended with another visual element corresponding to the display object while rendering. The set of clip instructions can specify that the visual element corresponding to the display object is to clip or truncate another visual element corresponding to another display object while rendering. In some implementations, the set of clip instructions can include a set of start clipping instructions, a set of apply clipping instructions, and a set of end clipping instructions. The set of filter instructions can specify that the visual element corresponding to the display object is to be filtered while rendering. The set of draw video instructions can specify that video visual elements corresponding to the display object is to be drawn, rendered, or otherwise played in accordance to specifications of the video data of display object.

The set of HTML-based instructions can include HTML code (e.g., HTML5 markup). In some implementations, the set of HTML-based instructions can also include JavaScript code (e.g., using the "<script> . . . </script>" tags) and Cascading Style Sheets (CSS) markup. The set of HTML-based instructions can cause an application (e.g., web browser) to render the same visual content as the FLASH-based content item. It should be appreciated that executing the set of HTML-based instructions to render the visual content may save computer resources (e.g., CPU and memory use) as compared to executing the FLASH-based content item to render the same visual content. Thus, executing the set of HTML-based instructions may lower power consumption and allow the computing device to be available for other processes. Furthermore, sharing of the single, generated set of HTML-based instructions to render the visual content across multiple computing devices may lead to even greater savings in computer resources and power consumption.

In some implementations, responsive to identifying that the class type of the display object is a Bitmap class, computing system can generate a set of draw bitmap instructions. In some implementations, the computing system can identify a Bitmap data corresponding to the display object. The Bitmap data can include raster graphics data from an external image file or source of any raster graphics format, such as the Bitmap (BMP) format file, Portable Network Graphics (PNG) format file, Tagged Image File Format (TIFF) format file, Joint Photographic Experts Group (JPEG) format file, and Graphics Interchange Format (GIF), among others. In some implementations, the computing system can identify a location for the external image file or source. The location for the external image file or source can include a file path name on a storage of a computing device (e.g., storage of computer system 400) or a Uniform Resource Locator (URL) identifying a computer network location (e.g., "https://www.example.com/example.BMP"). In some implementations, the computing system can identify one or more alterations to the Bitmap data. The one or more alterations can be specified by the display object outside the external image file. The one or more alterations can include, for example, skewing the dimensions or resolution of the Bitmap data, manipulating pixels of the Bitmap data, specifying the transparency of the Bitmap data, and changing the color scheme of the Bitmap data, among others. In some implementations, the computing system can generate the set of draw shape instructions for the Bitmap data including the "<img>" tag, "src" tag specifying the source of the Bitmap data, and an "alt" tag specifying an alternate name or text for the Bitmap data. In some implementations, the computing system can generate the draw shape instructions for the one or more alterations to the Bitmap data using HTML-based code equivalent to the one or more alterations. For example, if the display object specifies that an alpha (e.g., opacity) of the Bitmap data is 50%, the computing system can generate the HTML-based code including "bmp.globalAlpha=0.5."

In some implementations, responsive to identifying that the class type of the display object is a TextField, TextLine, or StaticText class, the computing system can generate a set of draw text instructions. In some implementations, responsive to identifying that the class type of the display object is a TextField or TextLine class, the computing system can generate a set of draw edit-text instructions. In some implementations, responsive to identifying that the class type of the display object is a TextField, TextLine, or StaticText class, the computing system can generate a set of draw static-text instructions. In some implementations, the computing system can identify text data corresponding to the display object. The text data can include any string included in a text field of the display object. In some implementations, the computing system can generate the set of draw static-text instructions for the text data using the string included in the text field of the display object. For example, if the text field of the display object includes the string "XYZ," the computing system can generate the set of draw static-text instructions to include the code, "txt.filltext("XYZ")." In some implementations, the computing system can identify one or more properties of the text data. For example, the one or more properties of the text field can include font, size, color, rotation, scale, and background color, among others. In some implementations, the computing system can generate the set of draw edit-text instructions for the one or more alterations to the text data using HTML-based code equivalent to the one or more alterations. For example, if the display object specifies that the font of the text is "Comic Sans," the size 20 pixels, and justified to the center of the element, the computing system can generate the set of edit text instructions to include the code "txt.font="20px Comic Sans MS"" and "txt.textAlign="center"."

In some implementations, responsive to identifying that the class type of the display object is a Shape class, the computing system can generate a set of draw shape instructions. In some implementations, the computing system can identify Shape data corresponding to the display object. The Shape data can include a shape (e.g., rectangle, circle, and line), one or more reference points (e.g., end points, anchor points, end points, and coordinates), color, fill, gradient, opacity, rotation, scale, and curve, among others. In some implementations, the computing system can generate the set of draw shape instructions for the Shape data using HTML-based code equivalent to the Shape data. For example, if the display object specifies that the shape is a rectangle at a pixel position of (30, 40) and a pixel size of (60×20) using the FLASH-based code "shape.graphics.drawRect(30, 40, 60, 20)," the computing system can generate the HTML-based code for the set of draw shape instructions including "shp.fillRect(30, 40, 60 20)." In this example, if the display object specifies that the rectangle is to be filled with a radial gradient linear from blue to white, the computing system can generate the draw shape instruction with the HTML-based code including the "createLinearGradient( )" function specifying the respective color range.

In some implementations, responsive to identifying that the class type of the display object is a MovieClip class or a Sprite class, the computing system can generate the set of HTML-based instructions for each of the one or more children display objects of the MovieClip display object container or of the Sprite display object container. It should be appreciated that the MovieClip class may be a derived class of the Sprite class, including many of the same properties and functions. In some implementations, the computing system can generate a stack instruction corresponding to the stage display object of the MovieClip display object container or the Sprite display object container. The one or more children display objects can include display objects of other display object classes, such as the Bitmap class, Shape class, TextField class, TextLine class, and StaticText class. At least one of the one or more children display objects can be a first child display object and at least one other of the one or more children display objects can be a second child display object. As discussed above, the computing system can identify the class type for each of the one or more children display objects of the MovieClip display object container or of the Sprite display object container. In some implementations, the computing system can generate the set of HTML-based instructions for each of the one or more children display objects based on the class type identified for the respective frame display object. For example, the computing system can generate the set of HTML-based instructions for the respective frame display object using the functionalities described above.

In some implementations, the computing system can generate a set of blend instructions for the MovieClip display object container or the Sprite display object container. In some implementations, the computing system can identify a blend mode from the one or more children display objects of the MovieClip display object container or the Sprite display object container. In some implementations, the computing system can identify the blend mode, responsive or subsequent to generating the set of HTML-based instructions for each of the one or more children display objects or each of the one or more children display objects. Examples of blend modes can include normal (BlendMode.NORMAL), layer (BlendMode.LAYER), multiply (BlendMode.MULTIPLY), screen (BlendMode.SCREEN), lighten (BlendMode.LIGHTEN), darken (BlendMode.DARKEN), difference (BlendMode.DIFFERENCE), add (BlendMode.ADD), subtract (BlendMode.SUBTRACT), invert (BlendMode.INVERT), alpha (BlendMode.ALPHA), erase (BlendMode.ERASE), overlay (BlendMode.OVERLAY), hardlight (BlendMode.HARDLIGHT), and shader (BlendMode.SHADER), among others. In some implementations, the computing system can generate the set of blend instructions to include HTML-based code equivalent to the blend mode identified from the MovieClip display object container or the Sprite display object container. For example, if the blend mode specifies that two of the visual elements each corresponding to two children display objects associated with the MovieClip display object container or the Sprite display object container is to have color values inverted, multiplied, and inverted again (e.g., BlendMode.screen), the computing system can generate the set of blend instructions to include "cur_canvas.globalCompositeOperation=screen." In this example, the two children display objects may be children display objects of the MovieClip display object container or the Sprite display object container and the computing system can have generated the set of HTML-based instructions prior to generating the set of blend instructions.

In some implementations, the computing system can generate a set of clip instructions for the MovieClip display object container or the Sprite display object container. In some implementations, the computing system can identify at least two of the children display objects from the MovieClip display object container or the Sprite display object container. In some implementations, the at least three children display objects can correspond to a first child display object, a second child display object, and a third child display object. In some implementations, the computing system can identify that a visual element corresponding to the first child display object is to truncate or mask a visual element corresponding to the second child display object. In some implementations, the computing system can identify that a visual element corresponding to the first child display object is to truncate or mask a visual element corresponding to the second child display object. In some implementations, the computing system can identify that a visual element corresponding to the third child display object is to un-truncate or de-mask the visual element corresponding to the second child display object. In some implementations, the computing system can generate a set of start clipping instructions corresponding to the first child display object. In some implementations, the computing system can generate a set of apply clipping instructions corresponding to the second child display object. In some implementations, the computing system can generate a set of end clipping instructions corresponding to the third child display object.

In some implementations, the computing system can identify a filter from the one or more children display objects of the MovieClip display object container or the Sprite display object container. In some implementations, the computing system can identify the filter, responsive or subsequent to generating the set of HTML-based instructions for each of the one or more children display objects. Examples of filters can include bevel (BevelFilter), blur (BlurFilter), drop shadow (DropShadowFilter), glow (GlowFilter), gradient bevel (GrandientBevelFilter), gradient glow (GradientGlowFilter), color matrix (ColorMatrixFilter), convolution (ConvolutionFilter), displacement (DisplacementMapFilter), and shader (ShaderFilter), among others. In some implementations, the computing system can generate the set of clip instructions to include HTML-based code equivalent to the filter identified from the MovieClip display object container. In some implementations, the computing system can access a library of HTML-based code filters from the database to identify the HTML-based code equivalent to the filter identified from the MovieClip display object container or the Sprite display object container. For example, if the filter identified from the MovieClip display object container or the Sprite display object container is a drop shadow filter, the computing system can search the database for a drop shadow filter written in HTML-based code (e.g., JavaScript, CSS, or HTML).

In some implementations, responsive to identifying that the class type of the display object is a Video class, the computing system can generate a set of draw video instructions. In some implementations, the computing system can identify video data corresponding to the display object. The video data can include a resolution, cue point, encoding type, frame information, and key frame information, among others. The resolution can include width and height of video visual content corresponding to the display object. The cue point can include times or frames at which to trigger other actions. The encoding type can include, for example, video format (e.g., H.264, SPARK) and container (e.g., FLV, MP4, MP3, or F4V). The frame information can include visual content data for each frame of the video visual content corresponding to the display object. The key frame information can include processing data for each of the frames following a particular frame within the video visual content. In some implementations, the computing system can identify a location for an external video file or source to include into the set of draw video instructions. In some implementations, the computing system can identify a location for an external video stream source to include into the set of draw video instructions. In some implementations, the computing system can generate HTML-based code equivalent to the frame information and key information to include into the set of draw video instructions. For example, if the video class display object specifies that the frames within the video visual content are to be smoothed by interpolation, the computing system can access a library of HTML-based code for processing visual content to search for HTML-based code equivalent to the interpolation specified in the video display object and include into the set of draw video instructions.

The computing system can insert the set of HTML-based instructions (BLOCK 320). The computing system can insert the set of HTML-based instructions into an instruction list. The instruction list can be any data structure. The data structure can be, for example, an array, a matrix, a graph, a tree, a queue, a stack, a linked list, a skip list, and a struct, among others. In some implementations, the computing system can stack the set of HTML-based instructions to a stack of the instruction list. In some implementations, the computing system can append the set of HTML-based instructions to the instruction list. In some implementations, the computing system can append, add, or otherwise enqueue the set of HTML-based instructions to the instruction list. In some implementations, the computing system can insert the set of HTML-based instructions into the instruction list, subsequent to inserting another set of HTML-based instructions corresponding to a child display object into the instruction list. For example, the computing system can generate and insert a first set of HTML-based instructions corresponding to a display object container into the instruction list, then generate and insert a second set of HTML-based instructions corresponding to the left child display object into the instruction list, and finally generate and insert a third set of HTML-based instructions corresponding to the right child display object into the instruction list.

The computing system can determine whether there are more display objects in the display list (BLOCK 325). For example, the computing system can determine whether index for the current display object is at the length of the display list. If the index is less than the length of the display list, the computing device can determine that there are more display objects in the display list.

The computing system can identify a next display object in the display list (BLOCK 330). Subsequently, the computing system can repeat the functionality detailed in BLOCKS 310-325 above for each of the other display objects identified in the display list. For example, subsequent to inserting the set of HTML-based instructions for a first display object of the display list to the instruction list, the computing system can identify a class type for a second display object, generate a second set of HTML-based instructions based on the identified class type for the second display object, and insert the second set of HTML-based instructions to the instruction list. The computing system can then again determine whether there are more display objects in the display list, and repeat the functionality described in BLOCKS 310-325.

The computing system can generate an execution policy (BLOCK 335). The execution policy can specify an application (e.g., web browser or program executing on a client device) to execute the sets of HTML-based instructions in the instruction list based on a trigger condition. In some implementations, the computing system can generate the execution policy concurrent to, independent of, prior to, or subsequent to generating the sets of HTML-based instructions. In some implementations, the computing system can insert the execution policy into the HTML-based content item that includes the instruction list. In some implementations, the computing system can insert the execution policy into the instruction list. In some implementations, the computing system can store the execution policy onto the database.

In some implementations, the trigger condition can specify that the application is to execute at least one of the sets of HTML-based instructions, responsive to determining that the application is idle. In some implementations, the trigger condition can specify that the application is to execute at least one of the sets of HTML-based instructions within a predetermined time window, subsequent to determining that the application is idle. In some implementations, the trigger condition can specify that the application is monitor for a remaining idle time period to execute at least one of the sets of HTML-based instructions and stop execution of the set of HTML-based instructions when the application detects the remaining idle time period is below a predetermined threshold. For example, if the instruction list include a first set of HTML-based instructions and a second set of HTML-based instructions, an application rendering the visual content using the instruction list can execute the first set of HTML-based instructions while the application is idle run other processes (e.g., other elements on a web page). The application can then wait until completing the execution of other processes. Once the application has determined that it is idle, the application can then execute the second set of HTML-based instructions in the instruction list. In this example, the application can determine that the application is idle by invoking the "requestIdleCallback( )" function. The application can then execute some of the sets of HTML-based instruction in the instruction list either during a predetermined time window or until the application determines that the application is no longer idle again.

In some implementations, the trigger condition can specify that the application is to execute at least one of the sets of HTML-based instructions, responsive to determining that a time duration of executing at least one of the sets of HTML-based instructions exceeds a predefined time delay. For example, if the instruction list includes a first set of HTML-based instructions and a second set of HTML-based instructions, an application rendering the visual content using the instruction list can execute the first set of HTML-based instructions in a first time duration and subsequent execute the second set of HTML-based instructions in a second time duration. In this example, both the first time duration and the second time duration can be specified by invoking the "setTimeout( )" function.

The computing system can store the instruction list in a database (BLOCK 340). In some implementations, the computing system can store the instruction list and the execution policy in a data structure onto the database. In some implementations, the computing system can store the instruction list onto the database, while traversing the display list. For example, the computing system can store the instruction list onto the database as the computing system generates each of the sets of HTML-based instructions. In some implementations, the computing system can create or instantiate a HTML-based content item. In some implementations, the computing system can generate HTML code based on the sets of HTML-based instructions of the instruction list for writing onto the HTML-based content item. For example, the computing system can create an HTML file corresponding to an HTML-based content item and write HTML code based on a set of HTML-based instructions onto the HTML file.

In some implementations, the computing system can group the HTML-based instructions in the instruction list based on a weight for each of the sets of the HTML-based instructions. Each of the weights for the sets of HTML-based instructions can be predetermined based on a priority of rendering. For example, weights for sets of draw text instructions can be set to be greater than the weights for sets of draw shape instructions, indicating a higher priority of drawing text while rendering the visual content. In some implementations, the weights for each of the sets of the HTML-based instructions may be used to group or otherwise partition executions of one or more sets of the HTML-based instructions. For example, if the weights for the sets of filter instructions are the same as sets of blend instructions but different from the sets of draw text instructions, a computing device executing the instruction can execute the filter instructions and the blend instructions separately from the draw text instructions.

In some implementations, the computing system can transmit the instruction list and the execution policy to the content provider computing system, content publisher computing system or client device. In some implementations, the computing system can access the instruction list and the execution policy from the database. In some implementations, the computing system can transmit the instruction list, responsive to receiving a request for content. In some implementations, the computing system can transmit the instruction list in a HTML-based content item for presentation on an information resource (e.g., webpage). In some implementations, the HTML-based instructions can cause a computing system (e.g., the content provider computing system, content publisher computing system or client device) to execute the instruction list to render visual content in accordance with an execution policy. For example, the computing system can transmit the instruction list, responsive to receiving a request for content from a client device. The request may have been sent by the client device while loading a web page including visual content. Subsequent to receiving the instruction list, the client device can render visual content by executing the sets of HTML-based instructions. The client device can execute the sets of HTML-based instructions in accordance with the execution policy.

Figure 4:
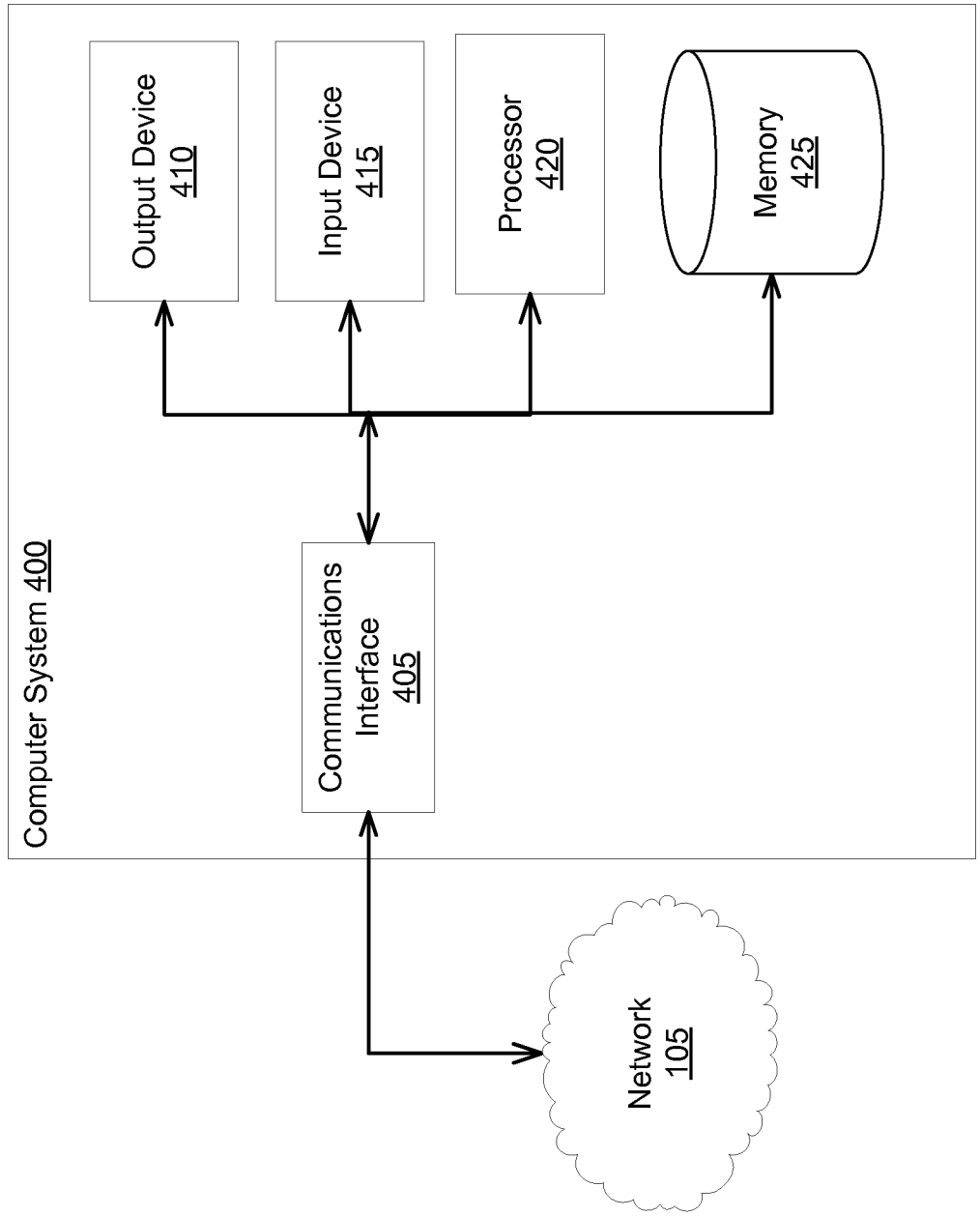
FIG. 4 is a block diagram illustrating a general architecture for a computer system that may be employed to implement elements of the systems and methods described and illustrated herein, according to an illustrative implementation.

FIG. 4 shows the general architecture of an illustrative computer system 400 that may be employed to implement any of the computer systems discussed herein (including the system 110 and its components such as the transcoder module 130 and the policy generator module 135) in accordance with some implementations. The computer system 400 can be used to provide information via the network 105 for display. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in the data processing system 110 or the other components of the system 110 such as the transcoder module 130 and the policy generator module 135, among others.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 425 to store information related to the availability of inventory of one or more content units, reservations of one or more content units, among others. The memory 425 can include the database 140. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. For example, the communications interface(s) 405 may be coupled to a wired or wireless network, bus, or other communication means and may therefore allow the computer system 400 to transmit information to or receive information from other devices (e.g., other computer systems). While not shown explicitly in the system of FIG. 1, one or more communications interfaces facilitate information flow between the components of the system 400. In some implementations, the communications interface(s) may be configured (e.g., via various hardware components or software components) to provide a website as an access portal to at least some aspects of the computer system 400. Examples of communications interfaces 405 include user interfaces (e.g., web pages), through which the user can communicate with the data processing system 110.

The output devices 410 of the computer system 400 shown in FIG. 4 may be provided, for example, to allow various information to be viewed or otherwise perceived in connection with execution of the instructions. The input device(s) 415 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The transcoder module 130 and the policy generator module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) FLASH drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 400 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the transcoder module 130 and the policy generator module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to converting FLASH content to HTML content, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of converting vector graphics to HyperText Markup Language (HTML) content, comprising:

receiving, by a transcoder executing on one or more processors, a content item having a vector graphic and text defined by a plurality of display objects arranged in a hierarchy, the plurality of display objects comprising a first display object, a second display object, and a third display object, the third display object specifying a combination of a rendering of the first display object with a rendering of the second display object in accordance with a filter operation;

identifying, by the transcoder, an object type for each display object of the plurality of display objects, the object type corresponding to at least one of the vector graphic or the text;

generating, by the transcoder, for each display object of the first display object and the second display object, a HTML-based instruction set based on the display object and the corresponding object type identified for the display object, the HTML-based instruction set including at least one of a function to render the vector graphic or a function to render the text of the content item defined by the corresponding display object;

generating, by the transcoder, based on the third display object and the object type identified for the third display object and responsive to determining that the third display object specifies the combination, at least one HTML-based instruction set including a function to generate a composite rendering of HTML-based instruction sets for the first display object and the second display object in accordance with the filter operation;

inserting, by the transcoder, a corresponding plurality of HTML-based instruction sets into an instruction list for rendering the vector graphic and the text of the content item;

generating, by a policy generator executing on the one or more processors based on a type of instruction for each of the plurality of HTML-based instruction sets, an execution policy including one or more rules, the one or more rules specifying one of a timing and a sequence for a web application in executing the plurality of HTML-based instruction sets relative to processes of the web application external to the instruction list; and storing, by the one or more processors, onto a database, the instruction list and the execution policy for the instruction list in a data structure.

2. The method of claim 1, wherein generating the execution policy further comprises generating the execution policy specifying the timing for executing the plurality of HTML-based instruction sets based on a trigger condition, the trigger condition specifying the application to execute at least one of the plurality of HTML-based instruction sets responsive to determining that the application is idle.

3. The method of claim 1, wherein generating the execution policy further comprises generating the execution policy specifying the timing for executing the plurality of HTML-based instruction sets based on a trigger condition, the trigger condition specifying the application to execute at least one of the plurality of HTML-based instruction sets responsive to determining that a time duration of the execution of at least one of the plurality of HTML-based instruction sets exceeds a predefined time delay.

4. The method of claim 1, wherein generating the execution policy further comprises generating the execution policy specifying the sequence for the plurality of HTML-based instruction sets based on a weight for each of the plurality of HTML-based instruction sets.

5. The method of claim 1, further comprises determining, by the transcoder, that a display object of the plurality of display objects includes a child display object;

identifying, responsive to determining that the display object includes the child display object, by the transcoder, an object type for the child display object;

generating, by the transcoder, a third HTML-based instruction set based on the object type for the child display object; and inserting, by the transcoder, the third HTML-based instruction set into the instruction list.

6. The method of claim 1, wherein identifying the class type further comprises determining that the display object includes a display object container, the display object container comprising a plurality of child display objects; and
  wherein generating the HTML-based instruction set further comprises generating, responsive to determining that the display object includes the display object container, a corresponding HTML-based instruction set for each of the plurality of child display objects based on the object type of the child display object.

7. The method of claim 1, wherein generating the HTML-based instruction set further comprises generating the HTML-based instruction set including at least one of a stack instruction, a clip instruction, a blend instruction, a draw shape instruction, a draw text instruction, a draw bitmap instruction, and a draw video instruction.

8. The method of claim 1, wherein inserting the plurality of HTML-based instruction sets further comprises enqueueing the plurality of HTML-based instruction sets into the instruction list, the instruction list including a queue data structure.

9. The method of claim 1, further comprising identifying, by the transcoder, for each HTML-based instruction set of the plurality of HTML-based instruction sets, a rendering priority based on the type of instruction for the HTML-based instruction set, the type of instruction corresponding to one of a plurality of object types; and
  wherein generating the execution policy further comprises generating the execution policy including the one or more rules, the one or more rules specifying one of the timing and the sequence in executing the plurality of HTML-based instruction sets based on a corresponding plurality of rendering priorities.

10. The method of claim 1, further comprising identifying, by the transcoder, subsets from the plurality of HTML-based instruction sets based on the type of instruction for each of the plurality of HTML-based instruction sets; and
  wherein generating the execution policy further comprises generating the execution policy including the one or more rules, the one or more specifying executing of the plurality of HTML-based instruction sets in accordance with the identified subsets.

11. The method of claim 1, wherein the content item includes a Shockwave Flash (SWF) content item.

12. A system for converting vector graphics to HyperText Markup Language (HTML) content, comprising:
  a transcoder executable on one or more processors configured to:
    receive a content item having a vector graphic and text defined by a plurality of display objects arranged in a hierarchy, the plurality of display objects comprising a first display object, a second display object, and a third display object, the third display object specifying a combination of a rendering of the first display object with a rendering of the second display object in accordance with a filter operation;
    identify an object type for each display object of the plurality of display objects, the object type corresponding to at least one of the vector graphic and the text;
    generate, for each display object of the first display object and the second display object, a HTML-based instruction set based on the display object and the object type identified for the corresponding display object, the HTML-based instruction set including at least one of a function to render the vector graphic or a function to render the text of the content item defined by the corresponding display object;
    generate, based on the third display object and the object type identified for the third display object and responsive to determining that the third display object specifies the combination, at least one HTML-based instruction set including a function to generate a composite rendering of HTML-based instruction sets for the first display object and the second display object in accordance with the filter operation; and
    insert, for the plurality of display objects of the display list, a corresponding plurality of HTML-based instruction sets into an instruction list for rendering the vector graphic and the text of the content item;
  a policy generator executable on the one or more processors configured to generate, based a type of instruction for each of the plurality of HTML-based instruction sets, an execution policy including one or more rules, the one or more rules specifying one of a timing and a sequence for a web application in executing the plurality of HTML-based instruction sets relative to processes of the web application external to the instruction list; and
  the one or more processors configured to store, onto a database, the instruction list and the execution policy for the instruction list in a data structure.

13. The system of claim 12, wherein the policy generator is further configured to generate the execution policy specifying the timing for executing the plurality of HTML-based instruction sets based on a trigger condition, the trigger condition specifying the application to execute at least one of the plurality of HTML-based instruction sets responsive to determining that the application is idle.

14. The system of claim 12, wherein the policy generator is further configured to generate the execution policy specifying the timing for executing the plurality of HTML-based instruction sets based on a trigger condition, the trigger condition specifying the application to execute at least one of the plurality of HTML-based instruction sets responsive to determining that a time duration of the execution of at least one of the plurality of HTML-based instruction sets exceeds a predefined time delay.

15. The system of claim 12, wherein the policy generator is further configured to generate the execution policy specifying the sequence for executing the plurality of HTML-based instruction sets based on a weight for each of the plurality of HTML-based instruction sets.

16. The system of claim 12, wherein the transcoder is further configured to:
  determine that a display object of the plurality of display objects includes a child display object;
  identify, responsive to determining that the display object includes the child display object, an object type for the child display object;
  generate a third HTML-based instruction set based on the class type for the child display object; and
  insert the third HTML-based instruction set into the instruction list.

17. The system of claim 12, wherein the transcoder is further configured to:
  determine that a display object of the plurality of display objects includes a display object container, the display object container comprising a plurality of child display objects;
  generate, responsive to determining that the display object includes the display object container, a corresponding HTML-based instruction set for each of the plurality of child display objects based on the object type of the child display object.

18. The system of claim 12, wherein the transcoder is further configured to:
- generate the HTML-based instruction set including at least one of a stack instruction, a clip instruction, a blend instruction, a draw shape instruction, a draw text instruction, and a draw bitmap instruction.

19. The system of claim 12, wherein the data structure for the instruction list comprises a queue data structure; and
- wherein the transcoder is further configured to enqueue the plurality of HTML-based instruction sets into the instruction list.

\* \* \* \* \*